US009830880B1

(12) United States Patent
Wyatt

(10) Patent No.: US 9,830,880 B1
(45) Date of Patent: Nov. 28, 2017

(54) METHOD AND SYSTEM FOR ADJUSTING THE REFRESH RATE OF A DISPLAY DEVICE BASED ON A VIDEO CONTENT RATE

(75) Inventor: David Wyatt, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2589 days.

(21) Appl. No.: 12/507,702

(22) Filed: Jul. 22, 2009

(51) Int. Cl.
*G06T 1/00* (2006.01)
*G09G 5/00* (2006.01)

(52) U.S. Cl.
CPC ....... *G09G 5/00* (2013.01); *G09G 2340/0435* (2013.01)

(58) Field of Classification Search
None
See application file for complete search history.

(56) References Cited

U.S. PATENT DOCUMENTS 5,451,981 A * 9/1995 Drako .................... G09G 5/393 345/545
2002/0027541 A1 3/2002 Cairns et al.
2002/0030635 A1* 3/2002 McGowan ............... G09G 5/12 345/5
2003/0189576 A1* 10/2003 Pan ...................... G09G 3/3611 345/589
2005/0114894 A1 5/2005 Hoerl
2005/0177837 A1* 8/2005 Mensah .................... G06F 9/46 719/328
2006/0001641 A1* 1/2006 Degwekar ............ G09G 3/3406 345/102
2006/0146056 A1* 7/2006 Wyatt .................... G09G 5/006 345/501
2008/0055318 A1* 3/2008 Glen ............................ 345/501
2010/0164966 A1* 7/2010 Sakariya ....................... 345/520

OTHER PUBLICATIONS

Office Action, U.S. Appl. No. 11/957,379 dated Feb. 9, 2011.

* cited by examiner

*Primary Examiner* — Weiming He
(74) *Attorney, Agent, or Firm* — Artegis Law Group, LLP

(57) ABSTRACT

One embodiment of the invention sets forth a technique for determining the frame rate of video content and modifying the refresh rate of a display device to be a multiple of the determined frame rate. A video player application accesses video content and transmits video content frames associated with the video content to a driver. Based on the received video content frames, the driver generates display frames for display on a display device. The driver also determines a frame rate associated with the video content and then modifies the refresh rate of the display device to be a multiple of the video content frame rate.

18 Claims, 6 Drawing Sheets

METHOD AND SYSTEM FOR ADJUSTING THE REFRESH RATE OF A DISPLAY DEVICE BASED ON A VIDEO CONTENT RATE

BACKGROUND OF THE INVENTION

Field of the Invention

Embodiments of the present invention relate generally to displaying video content having a particular frame rate, and more specifically, to adjusting the refresh rate of a display device based on a video content rate.

Description of the Related Art

A typical computing device includes a display screen configured to display digital images at a particular rate, referred to as the "refresh" rate. The refresh rate determines the number of digital images displayed on the display screen within a one second interval. For example, if the refresh rate of the display device is 60 Hz, then the display device outputs 60 digital images per second.

One source of digital images to be displayed on the display screen is video content that includes a sequence of frames, where each frame corresponds to a digital image. The video content may be derived from a variety of different sources and, thus, may have a variety of different frame rates. For example, video content derived from a film source may have a frame rate of 24 frames per second (fps).

When a conventional display device is used to display digital images associated with the video content, a software application may introduce duplicate frames into the sequence frames. However, since only certain images are duplicated and introduced into the sequence of frames, some frames appear to be displayed for a longer period of time than others, resulting in a visual artifact known as "jitter." For example, when jitter occurs, a moving object displayed on the display device does not move is a smooth and continuous fashion and, instead, moves in a jerky and discontinuous fashion. The jitter artifact causes video content having certain frame rates to appear unrealistic, thereby disrupting the visual experience of a viewer of the digital images associated with the video content.

As the foregoing illustrates, what is needed in the art is an improved technique for displaying video content.

SUMMARY OF THE INVENTION

Embodiments of the invention set forth a computer-implemented method for adjusting a refresh rate associated with a display device coupled to a computing device. The method includes the steps of determining that a video player application executing within the computing device operates in a first mode to cause one or more display frames derived from video content to be output to the display device, determining a frame rate associated with the video content, and modifying the refresh rate associated with the display device to be substantially equal to an integer multiple of the frame rate associated with the video content.

One advantage of the invention is that video content having a variety of different frame rates can be displayed on a display device without introducing a visually jarring jitter artifact. Since the refresh rate of the display device is modified to be an integer multiple of the frame rate of the video content, specific frames of the video content do not need to be duplicated to match the frame rate of the video content to the refresh rate of the display device.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
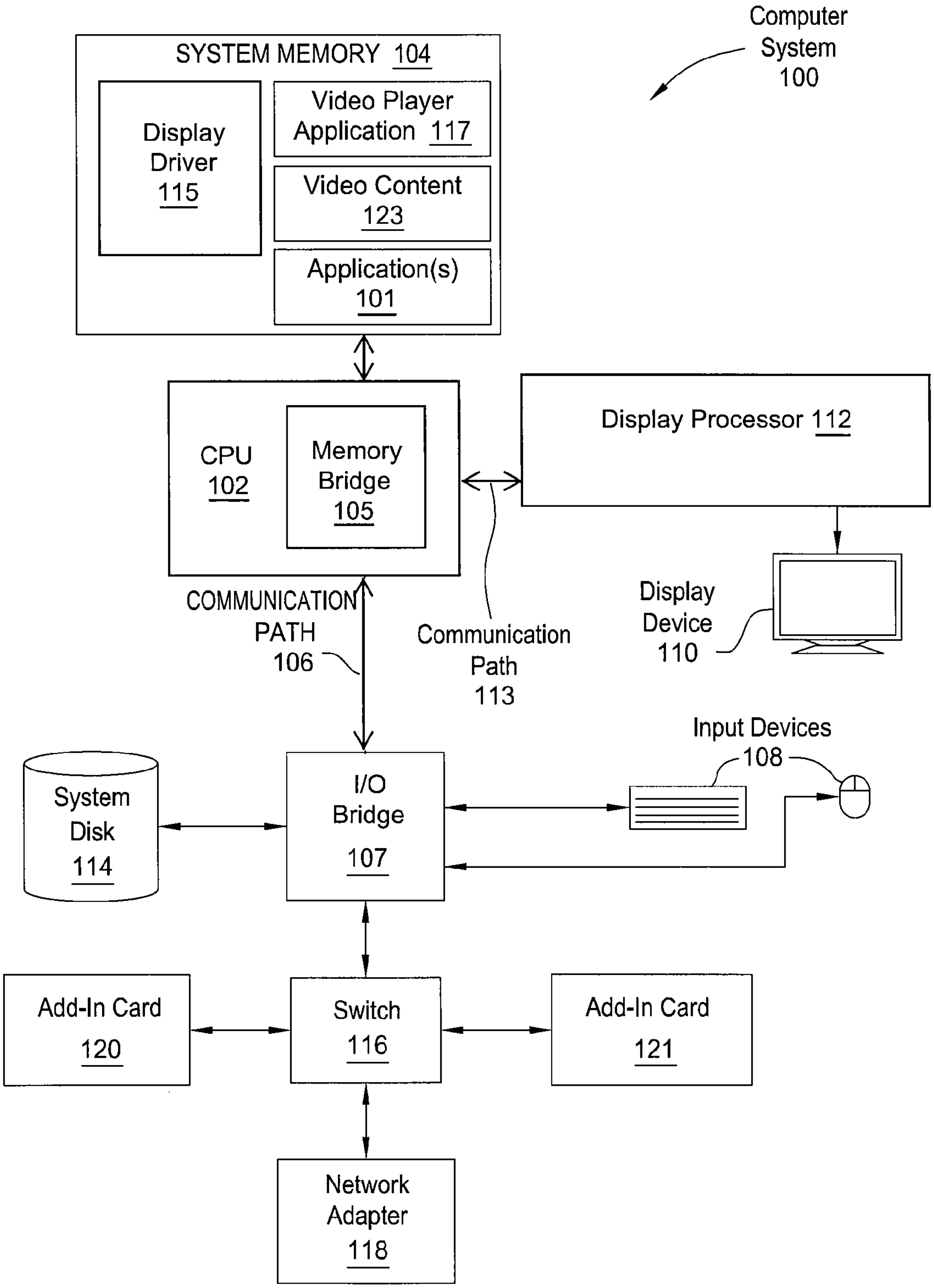
FIG. 1 is a block diagram that illustrates a computer system configured to implement one or more aspects of the invention.

FIG. 1 is a block diagram of a system 100 configured to implement one or more aspects of the present invention. The system 100 may be a personal computer, video game console, personal digital assistant, rendering engine, or any other device suitable for practicing one or more embodiments of the present invention.

As shown, the system 100 includes a central processing unit (CPU) 102 and a system memory 104. The CPU 102 includes a memory bridge 105 that communicates with the system memory 104 via a bus path. The CPU 102 includes one or more processing cores, and, in operation, the CPU 102 is the master processor of the system 100, controlling and coordinating operations of other system components. The CPU 102 is configured to execute software applications, and optionally an operating system, stored in the system memory 104.

The system memory 104 includes an execution image of an operating system, one or more applications 101 that are configured for execution by CPU 102, a display driver 115, a video player application 117, and video content 123. The applications 101 are software applications that may be executed by the CPU 102 to perform a wide variety of functionalities. The applications 101 could be computer-aided design (CAD) applications, word processing applications, web browser applications, email applications, and computer programming applications, among others. In one embodiment, the applications are configured to generate digital images for display on the display device 110.

The video player application 117 is a software application configured to cause a sequence of digital images to be displayed on the display device 110. As further described below, the video player application 117 is coupled to the display driver 115 via an interface that allows data to be exchanged between the video player application 115 and the display driver 115. The interface may be a hardware interface or a software interface such as, e.g., a software binding. The video player application 117 is configured to access the video content 123 and to transmit video content frames associated with the video content 123 to the display driver 115 over the interface. The display driver 115 then causes the video content frames to be processed to generate display frames that are displayed on the display device 110.

The memory bridge 105, which may be, e.g., a Northbridge chip, is connected via a bus or other communication path (e.g., a HyperTransport link) to an I/O (input/output) bridge 107. The I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to the CPU 102 via the memory bridge 105.

A display processor 112 is coupled to the memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory as well as a display controller. The graphics memory includes a display memory (e.g., a frame buffer) used for storing pixel data for each pixel of an output image. The graphics memory can be integrated in the same device as the GPU, connected as a separate device with the GPU, and/or implemented within the system memory 104.

The display processor 112 periodically delivers pixels to a display device 110 (e.g., a screen or conventional CRT, plasma, OLED, SED or LCD based monitor or television). Additionally, the display processor 112 may output pixels to film recorders adapted to reproduce computer generated images on photographic film. The display processor 112 can provide the display device 110 with an analog or digital signal.

A system disk 114 is also connected to I/O bridge 107 and may be configured to store content and applications and data for use by the CPU 102 and the display processor 112. The system disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between the I/O bridge 107 and other components such as a network adapter 118 and various add-in cards 120 and 121. The network adapter 118 allows the system 100 to communicate with other systems via an electronic communications network, and may include wired or wireless communication over local area networks and wide area networks such as the Internet.

Other components (not shown), including USB or other port connections, film recording devices, and the like, may also be connected to the I/O bridge 107. For example, an audio processor may be used to generate analog or digital audio output from instructions and/or data provided by the CPU 102, the system memory 104, or the system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, the display processor 112 incorporates circuitry optimized for graphics and video processing, including, for example, video output circuitry, and constitutes a graphics processing unit (GPU). In another embodiment, the display processor 112 incorporates circuitry optimized for general purpose processing. In yet another embodiment, the display processor 112 may be integrated with one or more other system elements, such as the memory bridge 105, the CPU 102, and the I/O bridge 107 to form a system on chip (SoC). In still further embodiments, the display processor 112 is omitted and software executed by the CPU 102 performs the functions of the display processor 112.

Pixel data can be provided to the display processor 112 directly from the CPU 102. In some embodiments, the display processor 112 generates rendered images of a scene for output to the display device 110. The rendered images may also be stored on computer-readable media in a digital format for display. Alternatively, the CPU 102 provides the display processor 112 with data and/or instructions defining the desired output images, from which the display processor 112 generates the pixel data of one or more output images. The data and/or instructions defining the desired output images can be stored in system memory 104 or graphics memory within display processor 112.

It will be appreciated that the system shown herein is illustrative and that variations and modifications are possible. The connection topology, including the number and arrangement of bridges, may be modified as desired. For instance, in some embodiments, the system memory 104 is connected to the CPU 102 directly rather than through a bridge, and other devices communicate with the system memory 104 via the memory bridge 105 and the CPU 102. In other alternative topologies the display processor 112 is connected to the I/O bridge 107 or directly to the CPU 102, rather than to the memory bridge 105. In still other embodiments, the I/O bridge 107 and the memory bridge 105 might be integrated into a single chip. The particular components shown herein are optional; for instance, any number of add-in cards or peripheral devices might be supported. In some embodiments, the switch 116 is eliminated, and the network adapter 118 and the add-in cards 120, 121 connect directly to the I/O bridge 107.

The display device 110 is configured to output display frames to a display area with a particular "refresh rate." The refresh rate is the frequency at which display frames are "repainted" on the display area of the display device 110. The display processor 112 outputs display frames to display device 110 at a frequency specified by the display refresh rate. Each refresh cycle of the display device 110 usually involves a series of processing steps, including accessing image data to generate a display frame and causing the display device 110 to update each pixel on the display area of the display device 110. The image data used to generate display frames may be received from an external source (e.g., a network such as the Internet) or may be based on image data stored in the system memory 104 and/or the system disk 114, such as the video content 123.

The video content 123 includes one or more video content frames that may be processed to generate display frames for output to the display device 110. For example, the video content frames could be scaled based on the size and/or resolution of the display device 110. Persons skilled in the art will understand that a wide variety of processing operations, in addition to scaling, may be implemented to generate display frames based on video content frames.

The video content 123 is associated with a particular frame rate, referred to herein as the "video content rate." In one embodiment, the video content rate is 24 frames per second (fps). Those skilled in the art will understand that the video content rate associated with the video content 123 may be any technically feasible frame rate. The video player application 117 is configured to access the video content 123 and to transmit video content frames associated with the video content 123 to the display driver 115 across the interface coupling the video player application 117 to the display driver 115. In one embodiment, the video player application 117 transmits the video content frames at a rate substantially equal to the video content rate. As referred to herein, "substantially equal to" includes "approximately equal to," "within a particular increment of," "within a threshold value of," as well as "equal to." The display driver 115 then causes the video content frames to be processed to generate display frames, as described, for output to the display device 110.

Figure 2A:
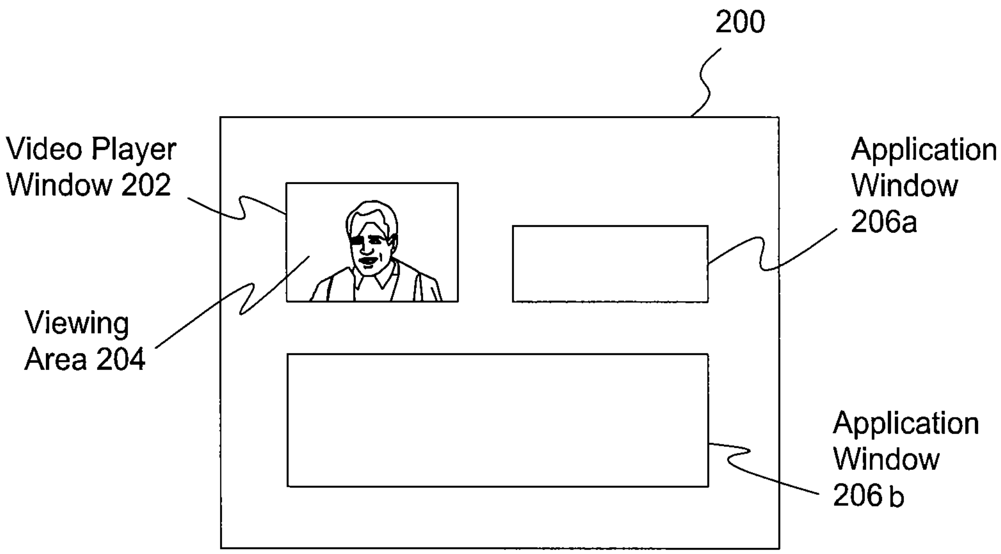
FIGS. 2A-2B are conceptual diagrams that illustrate a display area associated with a display device, according to one embodiment of the invention.
Figure 2B:

As described in greater detail in FIGS. 2A-2B, the display driver 115 is configured to determine when the video player application 117 operates in fullscreen mode. When the display driver 115 determines that the video player application 117 operates in fullscreen mode, the display driver 115 determines the video content rate using one or more different techniques, as described in greater detail in FIGS. 3A-3C. The display driver 115 modifies the refresh rate of the display device 110 to be a multiple of the video content rate. In one embodiment, the multiple of the video content rate is an odd or an even integer. In a further embodiment, the multiple is one. The display driver 115 then causes display frames derived from the video content 123 to be displayed within a display area of the display device 110, as described in greater detail in FIG. 4.

FIG. 2A is a conceptual diagram that illustrates a display area 200 associated with the display device 110, according to one embodiment of the invention. As shown, the display area 200 includes a video player window 202 and application windows **206*a* and 206*b***.

The application windows **206*a* and 206*b* are configured to display output images generated by the applications 101 described in FIG. 1. Each of the application windows 206*a* and 206*b* may be associated with the same application 101 or, alternatively, with different applications. The application windows 206*a* and 206*b* may display a variety of different output images associated with a variety of different applications 101. For example, a CAD application 101 may cause the application window 206*a* to display CAD-related output images, while a word processing application 101 may cause the application window 206*b*** to display output images that represent a text document.

The video player window 202 is generated by the video player application 117 described in FIG. 1 and is configured to display output images associated with the video content 123 within a viewing area 204. For example, if the video content 123 is a movie, then the video player window 202 may display output images associated with the movie within the viewing area 204. In one embodiment, the viewing area 204 of the video player window 202 is configured to occupy one portion of the display area 200 while the application windows **206*a*-206*b* may occupy other portions of the display area 200, as illustrated in FIG. 2B**.

The viewing area 204 may also be expanded to occupy substantially all of the display area 200 when the video player application 117 operates in fullscreen mode, as illustrated in FIG. 2B. As referred to herein, "substantially all" includes "the majority area" as well as "all." Those skilled in the art will understand that different video player applications 117 may implement fullscreen mode differently and may scale and/or crop the viewing area 204 based on the frame size of the video content 123. However, for the purposes of this description, when the video player application 117 operates in fullscreen mode, the video player application 117 displays output images that occupy substantially all of the display area 200.

When the video player application 117 operates in fullscreen mode, the display driver 115 modifies the refresh rate of the display device 110 to be an integer multiple of the video content rate. For example, when the video content 123 has a frame rate of 24 fps, the display driver 115 may modify the refresh rate of the display device 110 to be 24 Hz, 48 Hz, 72 Hz, or 96 Hz, and so forth. As further described in FIGS. 3A-3B, the display driver 115 modifies the refresh rate based on one or more of the following: a selection of a particular enumerated display mode received from the video player application 117, video content information received from the video player application 117, and/or a calculation of the video content rate.

Figure 3A:
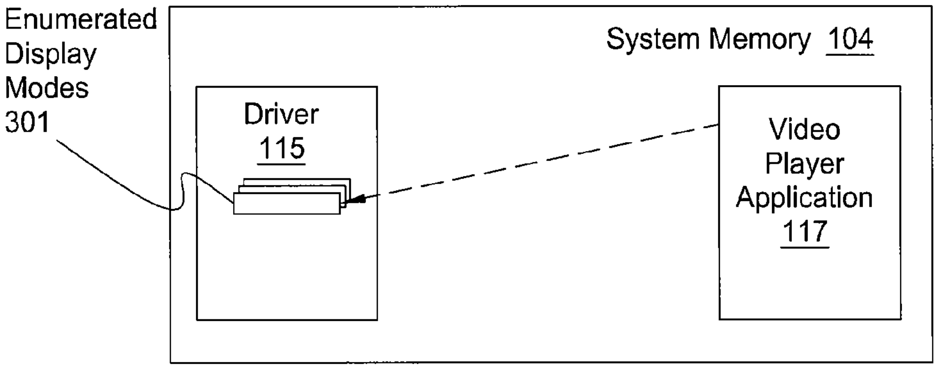
FIG. 3A is a conceptual diagram of a video player application selecting an enumerated display mode, according to one embodiment of the invention.

FIG. 3A is a conceptual diagram illustrating the video player application 117 selecting an enumerated display mode, according to one embodiment of the invention. As shown, FIG. 3A illustrates the system memory 104 that includes the display driver 115 and the video player application 117. The display driver 115 includes enumerated display modes 301. Each of the enumerated display modes 301 includes one or more display settings for the display device 110. For example, each enumerated display mode could include a refresh rate setting, a screen resolution setting, or a viewing area size setting, among others. When a particular enumerated display mode 301 is enabled, the display device 110 is configured to operate based on the settings included in the particular enumerated display mode 301. For example, when a particular enumerated display mode 301 is enabled, the display driver 115 could cause the refresh rate of the display device 110 to be substantially equal to the refresh rate setting associated with that enabled and enumerated display mode 301.

As previously described, the video player application 117 is configured to transmit a sequence of video content frames to the display driver 115. In one embodiment, prior to transmitting the sequence of video content frames, the video player application 117 accesses the enumerated display modes 301 within the display driver 115 and selects a particular enumerated display mode 301 based on the frame rate of the video content, i.e. the video content rate. The video player application 117 determines the video content rate by processing the video content 123. For example, the video player application 123 could process the video content 123 to extract metadata from the video content 123 that indicates the video content rate. The video player application 117 then selects a particular enumerated display mode 301 associated with a refresh rate that is a multiple of the video content rate. For example, when the video content 123 has a frame rate of 24 fps, the video player application 117 could select the enumerated display mode 301 associated with a 48 Hz refresh rate. The display driver 115 then modifies the refresh rate of the display device 110 based on the selected enumerated mode 301. In some embodiments, the video player application 117 continuously selects different enumerated display modes 301, and the display driver 115 dynamically adjusts the refresh rate of the display device 110 based on these different selections of enumerated display modes 301. In other embodiments, the display driver 115 receives user input specifying particular enumerated display mode 301. The display driver 115 then modifies the refresh rate of the display device 110 based on the user-selected enumerated mode 301.

In certain embodiments, the video player application 117 is not configured to select a particular enumerated display mode 301 based on the video content rate. In these embodiments, the display driver 115 may receive video content information that includes data specifying the video content rate, as described in FIG. 3B. Alternatively, the display driver 115 may detect the frame rate of the video content 123, as described in FIG. 3C.

Figure 3B:
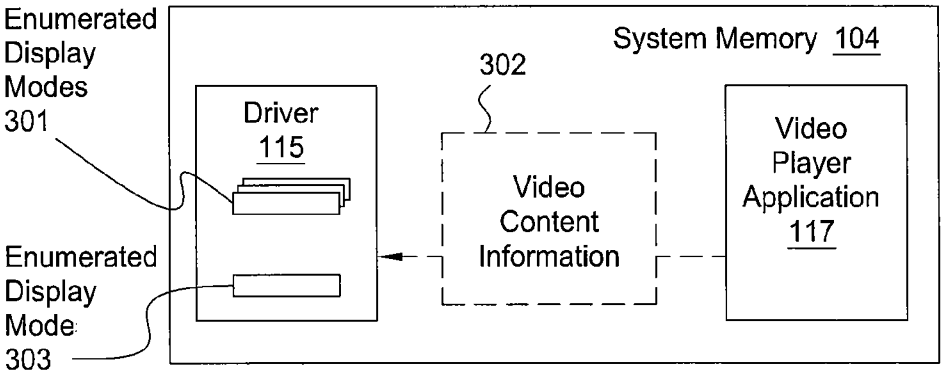
FIGS. 3B-3C are conceptual diagrams that illustrate various techniques for determining a frame rate associated with video content, according to one embodiment of the invention.

FIG. 3B is a conceptual diagram that illustrates a technique for determining a frame rate associated with the video content 123, according to one embodiment of the invention. As shown, the video player application 117 transmits video content information 302 to the display driver 115 prior to transmitting the sequence of video content frames to the display driver 115. The video content information 302 indicates the video content rate associated with the video content 123, among other things. In some embodiments, the video player application 117 determines the video content rate of the video content 123, as described above, and then generates the video content information 302 to include the determined video content rate.

When the display driver 115 receives the video content information 302, the display driver 115 extracts the video content rate from the video content information 302. The display driver 115 then identifies an enumerated display mode 301 associated with a refresh rate that is a multiple of the extracted video content rate.

In one embodiment, if the display driver 115 cannot identify an enumerated display mode 301 associated with a refresh rate that is a multiple of the extracted frame rate, then the display driver 115 generates an enumerated display mode 303. The enumerated display mode 303 includes some of the same settings as the enumerated display modes 301. In addition, the enumerated display mode 303 includes a refresh rate setting configured by the display driver 115 to be substantially equal to a multiple of the extracted video content rate. Once the display driver 115 generates the enumerated display mode 303, the video player application 117 or a user may select the enumerated display mode 303. Additionally, the display driver 115 may reuse the enumerated display mode 303 in order to reconfigure the display device 110 during subsequent operations.

The display driver 115 enables the identified and enumerated display mode 301 and then modifies the refresh rate of the display device 110 to be substantially equal to the refresh rate setting included in the identified and enumerated display mode 301. In embodiments where the display driver 115 generates the enumerated display mode 303, the display driver 115 modifies the refresh rate of the display device 110 to be substantially equal to the refresh rate setting included in the enumerated display mode 303.

In certain embodiments, the video player application 117 does not select a particular enumerated display mode 301, and the video player application 117 also does not transmit video content information 302 to the display driver 115. In such embodiments, the display driver 115 is configured to detect the video content rate associated with the video content 123, as described in FIG. 3C.

Figure 3C:
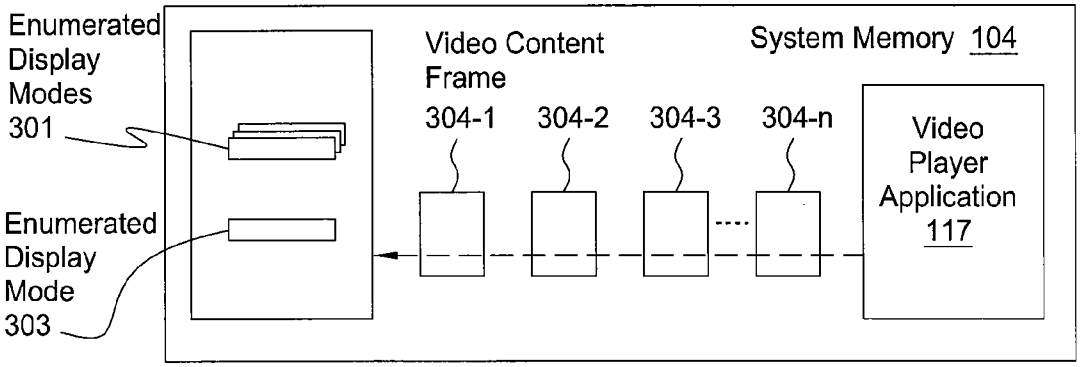

FIG. 3C is a conceptual diagram that illustrates a technique for determining a frame rate associated with the video content 123, according to one embodiment of the invention. As shown, the video player application 117 transmits video content frames 304-1 through 304-*n*, referred to herein collectively as video content frames 304, to the display driver 115. The video player application 117 is coupled to the display driver 115 through an interface across which data, such as the video content frames 304, can be transmitted. The video content frames 304 represent digital images associated with the video content 123. When the display driver 115 receives each video content frame 304, the display driver 115 processes the video content frame 304 to generate a display frame. For example, the display driver 115 may scale or crop the video content frame 304 or modify the resolution of the video content frame, among others, to generate a display frame. The display driver 115 then causes the display frame to be output to the display device 110.

In one embodiment, the video application 117 determines the video content rate, as described in FIG. 3A, and transmits the video content frames 304 to the display driver 115 at a rate that is substantially equal to the video content rate. Again, the video player application 117 transmits the video content frames across an interface that couples the video player application 117 to the display driver 115. The display driver 115 then determines the video content rate based on the number of video content frames 304 that are received within a given time interval. The display driver 115 then identifies an enumerated display mode 301 associated with a refresh rate that is a multiple of the determined video content rate.

In one embodiment, if the display driver 115 cannot identify an enumerated display mode 301 associated with a refresh rate that is a multiple of the determined frame rate, then the display driver 115 generates an enumerated display mode 303. The enumerated display mode 303 includes some of the same settings as the enumerated display modes 301. In addition, the enumerated display mode 303 includes a refresh rate setting configured by the display driver 115 to be substantially equal to a multiple of the determined video content. Once the display driver 115 generates the enumerated display mode 303, the video player application 117 or a user may select the enumerated display mode 303. Additionally, the display driver 115 may reuse the enumerated display mode 303 in order to reconfigure the display device 110 during subsequent operations.

The display driver 115 enables the identified and enumerated display mode 301 and then modifies the refresh rate of the display device 110 to be substantially equal to the refresh rate setting included in the identified and enumerated display mode 301. In embodiments where the display driver 115 generates the enumerated display mode 303, the display driver 115 modifies the refresh rate of the display device 110 to be substantially equal to the refresh rate setting included in the enumerated display mode 303.

In one embodiment, the display driver 115 modifies the refresh rate of the display device 110 by changing the pixel clock. However, changing the pixel clock typically requires that output to the display device 110 be suspended while a phase locked loop is reconfigured when a single clock source is used or while a different clock is selected when multiple clock sources are used. Rather than changing the pixel clock to continuously adjust the refresh rate, the display driver 115 may also modify the refresh rate by increasing or decreasing the duration of the horizontal or vertical blanking time between each display frame. In another embodiment, the display driver 115 determines a minimum refresh rate supported by the display device 110 based on information embedded in the display device 110, and then modifies the refresh rate to be the lowest multiple of the video content rate that is above the minimum refresh rate.

Figure 4:
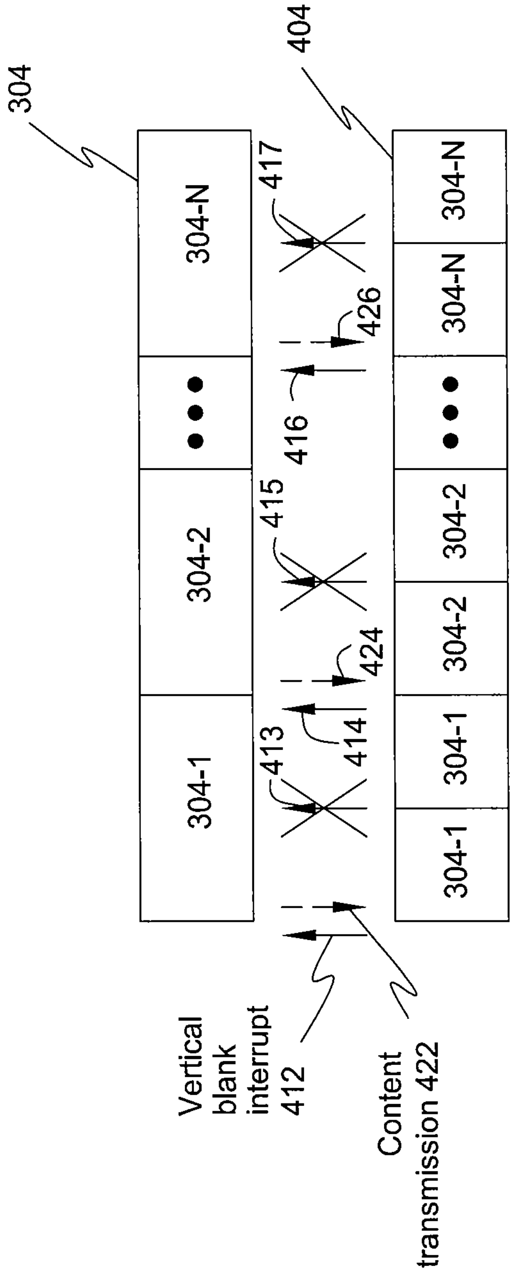
FIG. 4 is a conceptual diagram that illustrates video content frames being transmitted to a display driver, according to one embodiment of the invention.

As described in FIG. 4, when the display device 110 refreshes, the display driver 115 causes a vertical blank interrupt (VBI) to be transmitted to the video player application 117. In certain embodiments, the video player application 117 transmits a video content frame 304 in response to receiving the VBI from the display driver 115. In these embodiments, the display driver 115 is configured to suppress the transmission of specific VBIs to the video player application 117 in order to control the rate at which the video player application 117 transmits the video content frames 304, thereby causing the video player application 117 to transmit the video content frames 304 in lock-step with (i.e., synchronized with) the refresh rate of the display device 110.

FIG. 4 is a conceptual diagram that illustrates video content frames being transmitted to the display driver 115, according to one embodiment of the invention. As shown, video content frames 304 includes video content frames 304-1 through 304-N, as described in FIG. 3C. Display frames 404 are generated based on processing the display frames 304 and, in the embodiment shown, includes two copies of each video content frame 304.

FIG. 4 also illustrates a sequence of VBIs 412-417. The display driver 115 causes VBIs 412, 414, and 416 to be transmitted to the video player application 117 and suppresses the transmission of VBIs 413, 415, and 417. In response to receiving VBI 412, 414, and 416, the video player application 117 transmits a video content frame 304 to the display driver 115, indicated by content transmissions 422, 424, and 426.

As previously described, the display driver 115 causes a VBI to be transmitted to the video player application 117 each time the display device 110 refreshes. Since the display driver 115 modifies the refresh rate of the display device 110 to be a multiple of the video content rate, the rate at which the VBIs are received by the video player application 117 may be greater than the video content rate.

For example, in a conventional system, if the video content rate is equal to Y, and the refresh rate of a display device is equal to 2Y, then the display driver would cause VBIs to be transmitted to the video player application at a rate equal to 2Y, and the video player application would respond by transmitting video content frames at a rate equal to 2Y. However, since the display driver processes the video content frames at a rate equal to Y, the display driver 115 would receive video content frames at a rate equal to twice the frame rate of the video content.

In one embodiment, the display driver 115 is configured to suppress the transmission of certain VBIs in order to cause the video player 117 to transmit video content frames 304 with a rate substantially equal to the video content rate. Returning to the above example, the display driver 115 could suppress the transmission of every other VBI in order to cause the video player application 117 to transmit video content frames 304 at a rate substantially equal to Y. As shown, the display driver 115 suppresses VBIs 413, 415, and 417. As a result, the video player application 117 transmits video content frames 304 to the display driver 115 at a rate substantially equal to the video content rate.

For each video content frame received from the video player application 117, the display driver 115 generates a display frame. The display driver 115 then causes the display device 110 to output the display frame each time the display device 110 refreshes until another video content frame is received via a content transmission. The display driver 115 then generates another display frame and causes the display device 110 to output the another display frame. Thus, the display device 110 displays each display frame multiple times until a subsequent video content frame 304 is received by the display driver 115.

For example, as shown in FIG. 4, when the display driver 115 receives video content frame 304-1 via content transmission 422, the display driver 115 generates a first display frame for output to the display device 110. Since the first display frame is identical to the video content frame 304-1, the first display frame is labeled as 304-1. The display device 110 displays the first display frame twice before the display driver 115 receives video content frame 302-2 via content transmission 424. The display driver 115 then generates a second display frame for output to the display device 110 based on the video content frame 304-2. Since the second display frame is identical to the video content frame 304-2, the second display frame is labeled as 304-2. The display device 110 then displays the second display frame twice.

Although FIG. 4 illustrates the display device 110 outputting display frames twice for each content transmission, persons skilled in the art will understand that the display device 110 may output display frames any number of times before another video content frame 304 is received by the display driver 115, depending on video content rate and the refresh rate of the display device 110.

In one embodiment, the video player application 117 may ignore specific VBIs in order to transmit video content frames 304 to the display driver 115 at a rate substantially equal to the video content rate. Returning to the above example, the video player application 117 could ignore every other VBI in order to transmit video content frames 304 at a rate substantially equal to Y.

Figure 5:
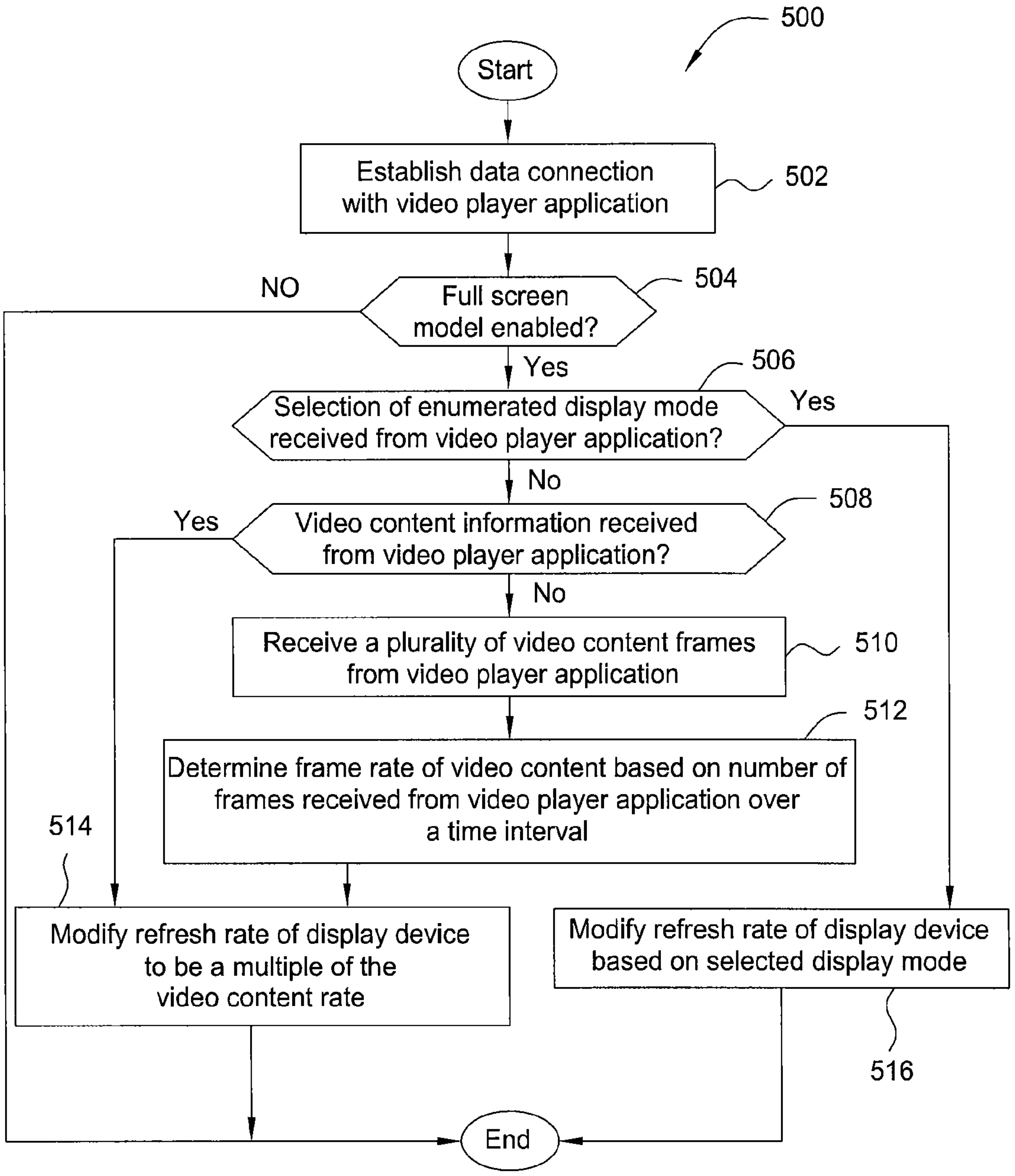
FIG. 5 is a flowchart of method steps for modifying the refresh rate of a display device, according to one embodiment of the invention.

FIG. 5 is a flowchart of method steps for modifying the refresh rate of a display device, according to one embodiment of the invention. Although the method 500 is described in conjunction with the system of FIG. 1, persons skilled in the art will understand that any system configured to perform the method steps, in any order, is within the scope of the invention.

The method 500 begins at step 502, where the display driver 115 establishes a data connection with the video player application 117. The display driver 115 and the video player application 117 may be stored together in the system memory 104 or, alternatively, may reside in separate memory units.

At step 504, the driver 502 determines whether fullscreen mode of the video player application 117 is enabled. In one embodiment, when fullscreen mode is enabled, the viewing area 204 included within the video player window 202 occupies substantially all of the display area 200 of the display device 110. In a further embodiment, the images output by the display device 110 are received exclusively from the video player application 117 while the video player application 117 operates in fullscreen mode. When the display driver 115 determines that the video player application 117 is not operating in fullscreen mode, the method 500 ends. When the display driver 115 determines that the video player application 117 is operating in fullscreen mode, the method 500 proceeds to step 506.

At step 506, the display driver 115 determines whether a selection of a particular enumerated display mode 301 has been received from the video player application 117. Each of the enumerated display modes 301 includes one or more display settings, including a refresh rate setting. When a particular enumerated display mode is enabled, the display driver 115 causes the refresh rate of the display device 110 to be substantially equal to the refresh rate setting associated with the enabled and enumerated display mode 301. If the display driver 115 determines that a selection of a particular enumerated display mode 301 has been received from the display driver 115, then the method 500 proceeds to step 516.

At step 516, the display driver 115 enables the selected enumerated display mode 301 and modifies the refresh rate of the display device 110 based on the refresh rate setting associated with the selected enumerated display mode 301. If the display driver 115 determines that a selection of a particular enumerated display mode 301 has not been received from the display driver 115, then the method 500 proceeds to step 508.

At step 508, the display driver 115 determines whether video content information 302 has been received from the video player application 117. In some embodiments, the video player application 117 generates the video content information 302 based on data included in the video content 123 or based on processing the video content 123. The video content information 302 specifies the video content rate associated with the video content 123, among other things. If the display driver 115 determines that the video content information 302 has been received from the video player application 117, then the method 114 proceeds to step 514.

At step 514, the driver modifies the refresh rate of the display device 110 to be a multiple of the video content rate specified by the video content information 302. The display driver 115 identifies an enumerated display mode 301 associated with a refresh rate setting that is a multiple of the video content rate and enables the identified enumerated display mode 301. In one embodiment, if the display driver 115 cannot identify an enumerated display mode 301 associated with a refresh rate that is a multiple of the video content rate, the display driver 115 generates an enumerated display mode 303 associated with a refresh rate setting that is a multiple of the video content rate, and then enables the generated, enumerated display mode 303. The method 500 then ends.

At step 508, if the display driver 115 determines that the video content information 302 has not been received from the video player application 117, then the method 500 proceeds to step 510. At step 510, the display driver 115 receives a plurality of video content frames 304 from the video player application 117. Each video content frame 304 represents a digital image associated with the video content 123. In one embodiment, the video application 117 transmits the video content frames 304 to the display driver 115 at a rate that is substantially equal to the frame rate associated with the video content 123, i.e. the video content rate.

At step 512, the display driver 115 determines the video content rate based on the number of video content frames 304 that are received from the video player application 117 within a given time interval. The video player application 117 is coupled to the display driver 115 via an interface that allows data to be exchanged between the video player application 117 and the display driver 115. The interface may be a hardware device, a software module, or a combination of hardware and software. The method then proceeds to step 514, as described above.

In one embodiment, the display driver 115 modifies the refresh rate of the display device 110 by changing the pixel clock. Rather than changing the pixel clock to continuously adjust the refresh rate, the display driver 115 may also modify the refresh rate by increasing or decreasing the duration of the horizontal or vertical blanking time between each display frame. In another embodiment, the display driver 115 determines a minimum refresh rate supported by the display device 110 based on information embedded in the display device 110, and then modifies the refresh rate to be the lowest multiple of the video content rate that is above the minimum refresh rate.

Figure 6:
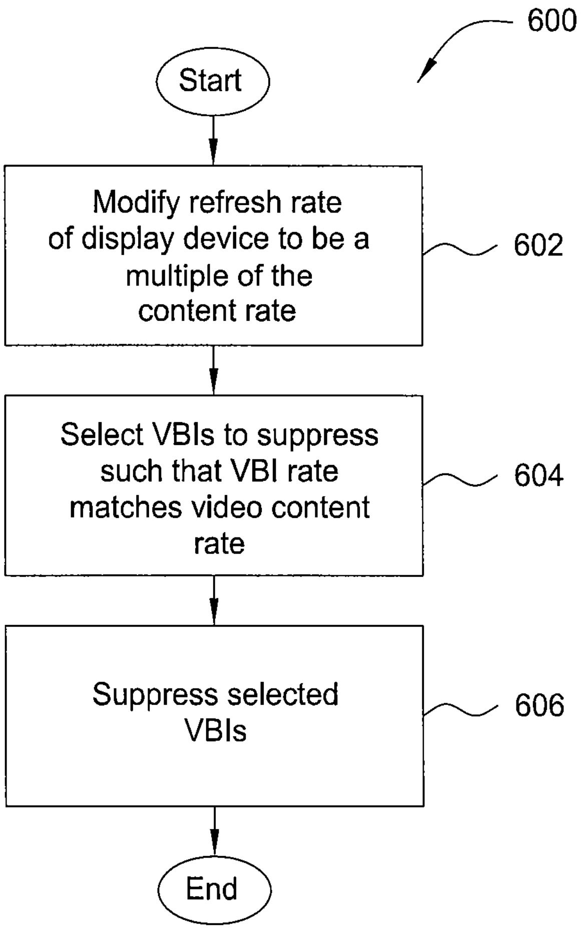
FIG. 6 is a flowchart of method steps for suppressing the transmission of vertical blanking interrupts, according to one embodiment of the invention.

FIG. 6 is a flowchart of method steps for suppressing the transmission of VBIs, according to one embodiment of the invention. Although the method 600 is described in conjunction with the system of FIG. 1, persons skilled in the art will understand that any system configured to perform the method steps, in any order, is within the scope of the invention.

As shown, the method 600 begins at step 602, where the display driver 115 modifies the refresh rate of the display device 110 to be a multiple of the video content rate. As described, the display driver 115 may modify the refresh rate of the display device 110 by increasing or decreasing the duration of the horizontal or vertical blanking time between each display frame.

At step 604, in one embodiment, the display driver 115 selects specific VBIs, the transmission of which can be suppressed in order to cause the rate at which the VBIs are transmitted to be substantially equal to the video content rate. Since certain video player applications 117 transmit a video content frame 304 to the display driver 115 each time a VBI is received, these video player applications 117 transmit the video content frames 304 at a rate that is greater than the rate at which the display driver 115 processes the video content frames 304 to generate the display frames 404. Accordingly, by suppressing the transmission of specific VBIs, the display driver 115 causes the video player application 110.

At step 606, in one embodiment, the display driver 115 suppresses the transmission of the selected VBIs. In an alternative embodiment, the method 500 skips step 604, and the video player application 117 ignores specific VBIs such that the video player application 117 transmits video content frames 304 at a rate substantially equal to the video content rate. In various embodiments, the display driver 115 suppresses the transmission of every other VBI, every third VBI, every fourth VBI, and so forth. In these embodiments, the display device displays a particular display frame twice, three times, four times, and so forth, until the display driver 115 receives a video content frame from the video player application 117 in response to a VBI. The method 600 then ends.

In sum, a video player application accesses video content and transmits video content frames associated with the video content to a driver. Based on the received video content frames, the driver generates display frames for display on a display device. The driver also determines a frame rate associated with the video content and then modifies the refresh rate of the display device to be a multiple of the video content frame rate.

In one embodiment, the driver is configured to receive information from the video player application that indicates a particular refresh rate for the display device to be used for displaying the video content, and then modifies the refresh rate of the display device accordingly. In another embodiment, the driver may receive information from the video player application that specifies the video content rate, and may then modify the refresh rate of the display device to be a multiple of the received video content rate. In yet another embodiment, the driver may determine the video content rate based on the rate at which video content frames arrive from the video player application, and may then modify the refresh rate of the display device to be a multiple of the determined video content rate.

The driver is further configured to suppress specific vertical blank interrupt signals in order to cause the video player application to transmit video content frames at a rate substantially equal to the video content rate.

Advantageously, video content having a variety of different frame rates can be displayed on a display device without introducing a visually jarring jitter artifact. Since the refresh rate of the display device is modified to be an integer multiple of the frame rate of the video content, specific frames of the video content do not need to be duplicated to match the frame rate of the video content to the refresh rate of the display device.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for adjusting a refresh rate associated with a display device coupled to a computing device, the method comprising:

determining that a video player application executing within the computing device operates in a first mode to cause one or more display frames derived from video content to be output to the display device;

determining a frame rate associated with the video content;

modifying the refresh rate associated with the display device to be substantially equal to an integer multiple of the frame rate associated with the video content;

receiving from the display driver a plurality of vertical blank interrupt signals, wherein each vertical blank interrupt signal is issued by the display driver at a rate according to the modified refresh rate; and suppressing, to the video player application, the transmission of at least one vertical blank interrupt signal in the plurality of vertical blank interrupt signals to cause the video player application to perceive the refresh rate associated with the display device as the frame rate associated with the video content, thereby causing the video player application to transmit frames of video content in lock-step with the perceived refresh rate of the display device.

2. The method of claim 1, wherein the step of determining that the video player application executing within the computing device operates in the first mode comprises determining that the video player application executing within the computing device operates in a fullscreen viewing mode, and wherein the one or more display frames occupy substantially all of an available viewing area of the display device when the video player operates in the fullscreen viewing mode.

3. The method of claim 1, wherein the step of determining the frame rate associated with the video content comprises extracting the frame rate associated with the video player application from video content information associated with the video content.

4. The method of claim 1, wherein the step of determining the frame rate associated with the video content comprises:

receiving from the video player application a plurality of video content frames associated with the video content used to generate the one or more display frames; and calculating the frame rate associated with the video content based on the number of video content frames received from the video player application within a time interval.

5. The method of claim 1, wherein the step of modifying the refresh rate associated with the display device is performed in response to receiving from the video player application a selection of an enumerated display mode that is associated with a refresh rate that is substantially equal to an integer multiple of the frame rate associated with the video content.

6. The method of claim 1, wherein the integer multiple of the frame rate associated with the video content comprises any integer, including one.

7. The method of claim 1, wherein the step of modifying the refresh rate associated with the display device comprises increasing or decreasing the duration of a horizontal blanking time and/or a vertical blanking time associated with the display device or adjusting a pixel clock associated with the display device.

8. A non-transitory computer-readable storage medium storing program instructions that, when executed by a processor, adjusts the refresh rate associated with a display device coupled to a computing device by performing the steps of:

determining that a video player application executing within the computing device operates in a first mode to cause one or more display frames derived from video content to be output to the display device;

determining a frame rate associated with the video content;

modifying the refresh rate associated with the display device to be substantially equal to an integer multiple of the frame rate associated with the video content;

receiving from the display driver a plurality of vertical blank interrupt signals, wherein each vertical blank interrupt signal is issued by the display driver at a rate according to the modified refresh rate; and suppressing, to the video player application, the transmission of at least one vertical blank interrupt signal in the plurality of vertical blank interrupt signals to cause the video player application to perceive the refresh rate associated with the display device as the frame rate associated with the video content, thereby causing the video player application to transmit frames of video content in lock-step with the perceived refresh rate of the display device.

9. The non-transitory computer-readable storage medium of claim 8, wherein the step of determining that the video player application executing within the computing device operates in the first mode comprises determining that the video player application executing within the computing device operates in a fullscreen viewing mode, and wherein the one or more display frames occupy substantially all of an available viewing area of the display device when the video player operates in the fullscreen viewing mode.

10. The non-transitory computer-readable storage medium of claim 8, wherein the step of determining the frame rate associated with the video content comprises extracting the frame rate associated with the video player application from video content information associated with the video content.

11. The non-transitory computer-readable storage medium of claim 8, wherein the step of determining the frame rate associated with the video content comprises:

receiving from the video player application a plurality of video content frames associated with the video content used to generate the one or more display frames; and calculating the frame rate associated with the video content based on the number of video content frames received from the video player application within a time interval.

12. The non-transitory computer-readable storage medium of claim 8, wherein the step of modifying the refresh rate associated with the display device is performed in response to receiving from the video player application a selection of an enumerated display mode that is associated with a refresh rate that is substantially equal to an integer multiple of the frame rate associated with the video content.

13. The non-transitory computer-readable storage medium of claim 8, wherein the integer multiple of the frame rate associated with the video content comprises any integer, including one.

14. The non-transitory computer-readable storage medium of claim 8, wherein the step of modifying the refresh rate associated with the display device comprises increasing or decreasing the duration of a horizontal blanking time and/or a vertical blanking time associated with the display device or adjusting a pixel clock associated with the display device.

15. A system for adjusting a refresh rate associated with a display device, comprising:

the display device; and a computing device coupled to the display device that includes:

a processor, and a system memory storing program instructions that, when executed by the processor, performs the steps of:

determining that a video player application being executed by the processor operates in a first mode to cause one or more display frames derived from video content to be output to the display device, determining a frame rate associated with the video content, modifying the refresh rate associated with the display device to be substantially equal to an integer multiple of the frame rate associated with the video content, receiving from the display driver a plurality of vertical blank interrupt signals, wherein each vertical blank interrupt signal is issued by the display driver at a rate according to the modified refresh rate, and suppressing, to the video player application, the transmission of at least one vertical blank interrupt signal in the plurality of vertical blank interrupt signals to cause the video player application to perceive the refresh rate associated with the display device as the frame rate associated with the video content, thereby causing the video player application to transmit frames of video content in lock-step with the perceived refresh rate of the display device.

16. The system of claim 15, wherein the step of determining the frame rate associated with the video content comprises:

extracting the frame rate associated with the video player application from video content information associated with the video content; or receiving from the video player application a plurality of video content frames associated with the video content used to generate the one or more display frames and calculating the frame rate associated with the video content based on the number of video content frames received from the video player application within a time interval.

17. The system of claim 15, wherein the step of modifying the refresh rate associated with the display device is performed in response to receiving from the video player application a selection of an enumerated display mode that is associated with a refresh rate that is substantially equal to an integer multiple of the frame rate associated with the video content.

18. The system of claim 15, wherein the step of modifying the refresh rate associated with the display device comprises increasing or decreasing the duration of a horizontal blanking time and/or a vertical blanking time associated with the display device and/or adjusting a pixel clock associated with the display device.

* * * * *